Sept. 27, 1955  G. V. W. ROTH ET AL  2,719,281
SIGNAL LIGHT FOR MARINE AVIATION AND VEHICULAR USE
Filed April 11, 1952  5 Sheets-Sheet 1
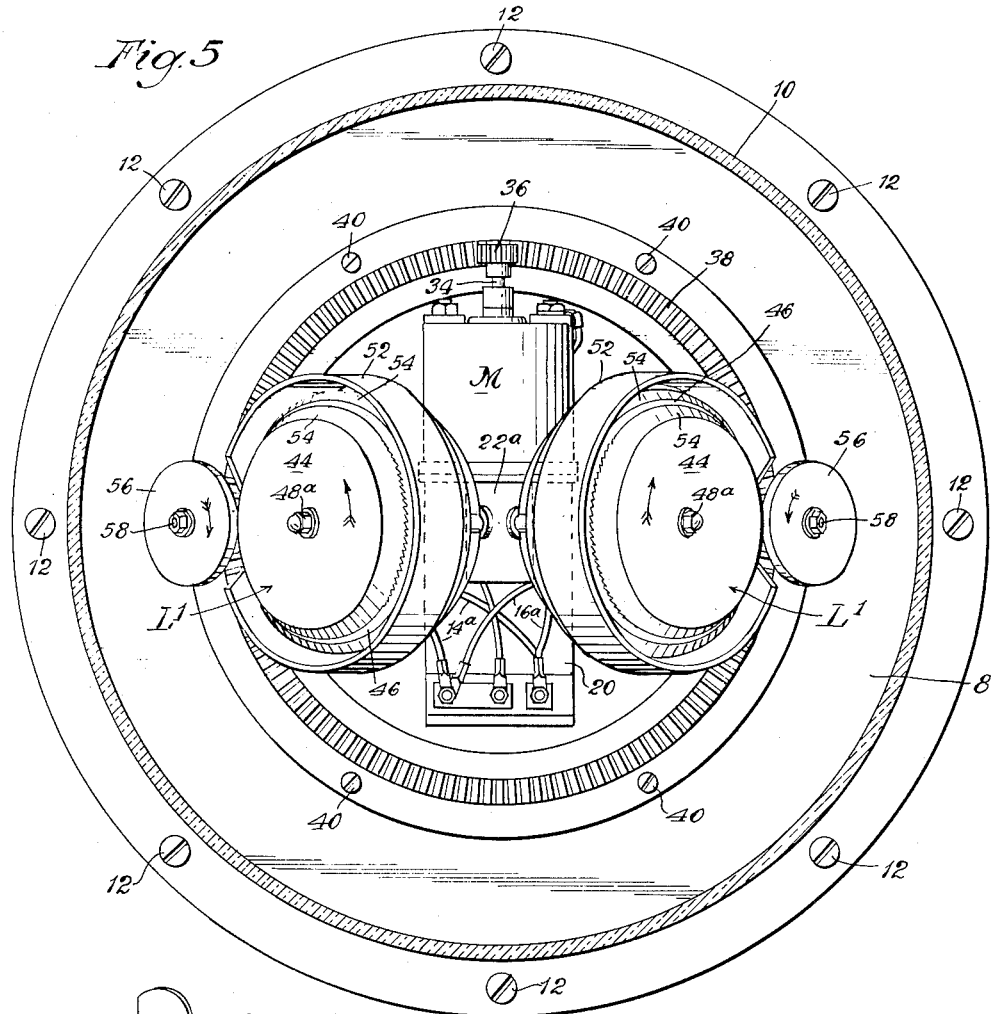
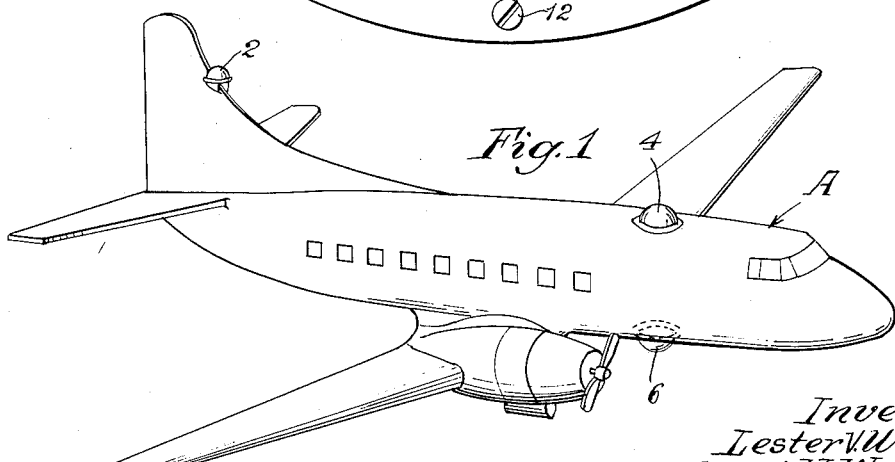
Inventors
Lester V. Walsh
Grant V. W. Roth
by Parker & Carter
Attorneys Sept. 27, 1955 G. V. W. ROTH ET AL 2,719,281
SIGNAL LIGHT FOR MARINE AVIATION AND VEHICULAR USE
Filed April 11, 1952 5 Sheets-Sheet 2
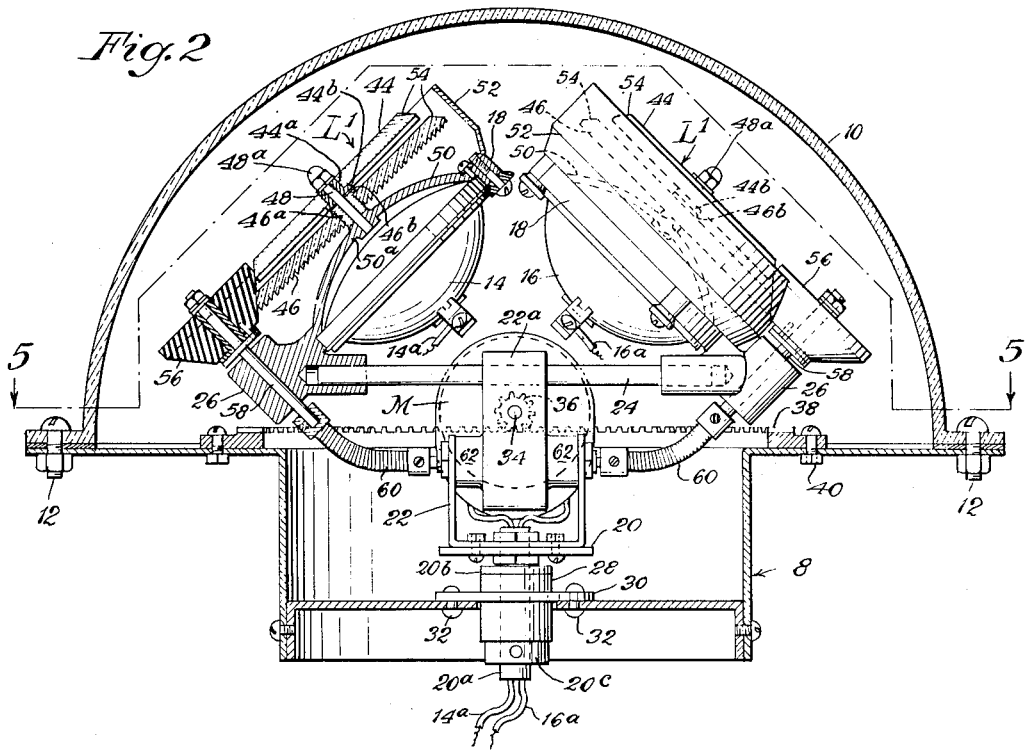
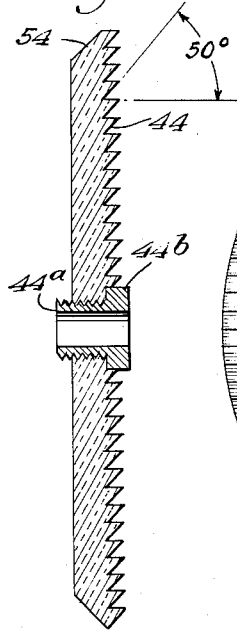
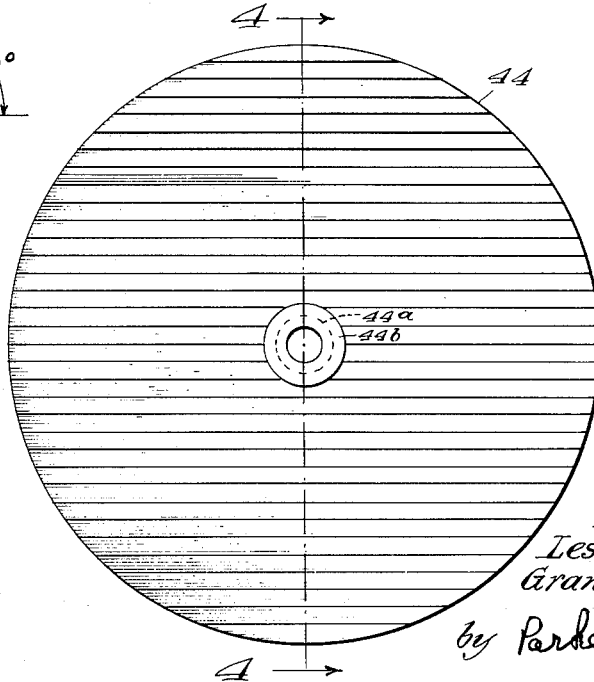
Inventors
Lester V. Walsh
Grant V. W. Roth
by Parker & Carter
Attorneys

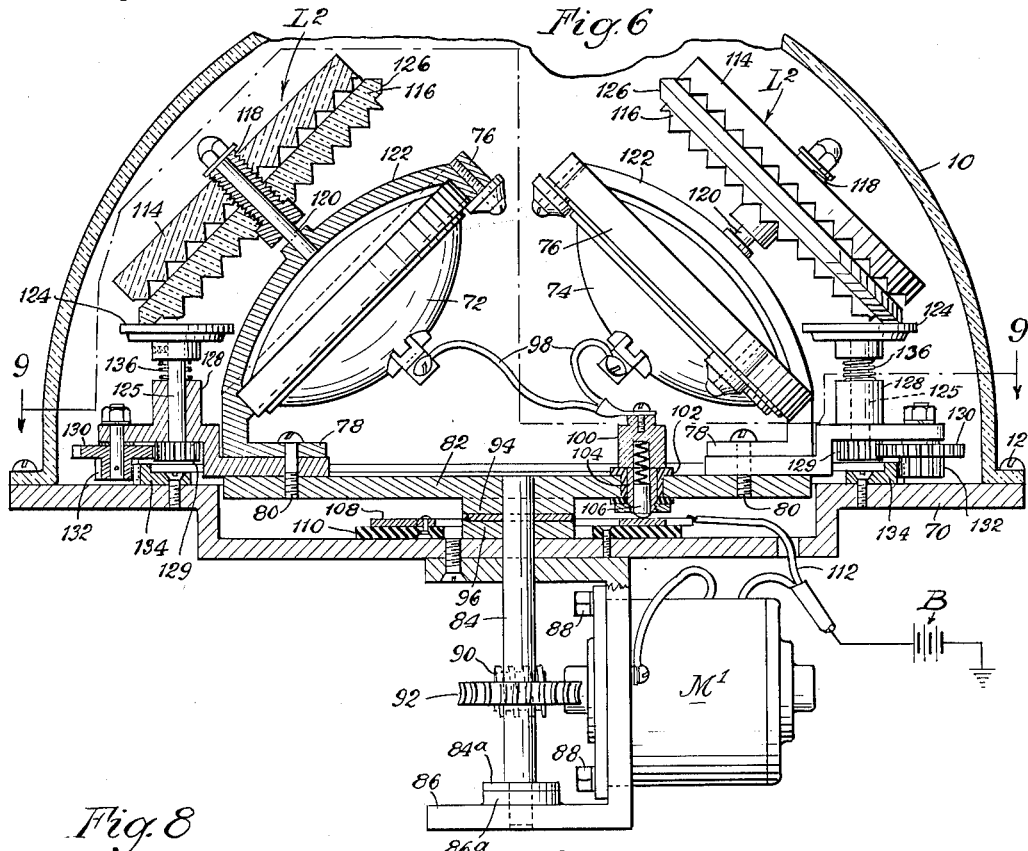
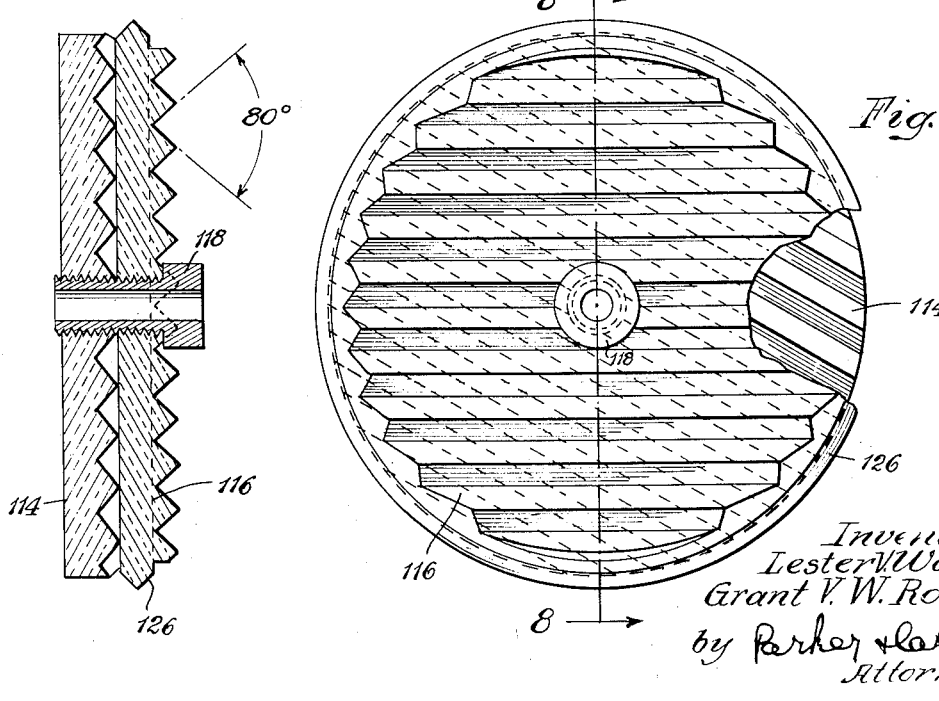

Inventors
Lester V. Walsh
Grant V. W. Roth
by Parker & Carter
Attorneys

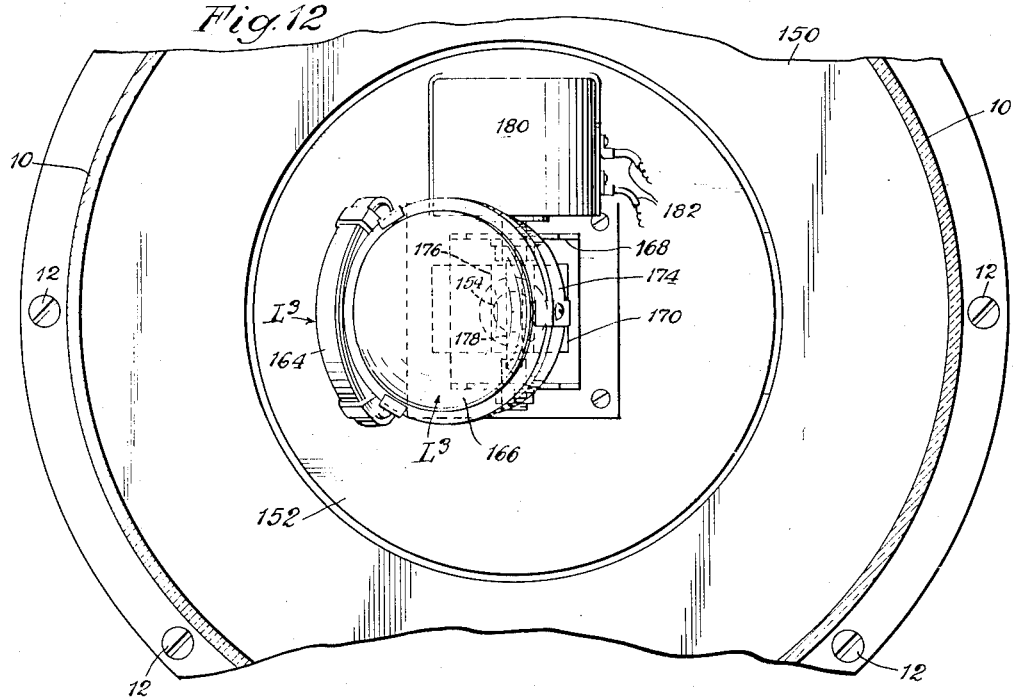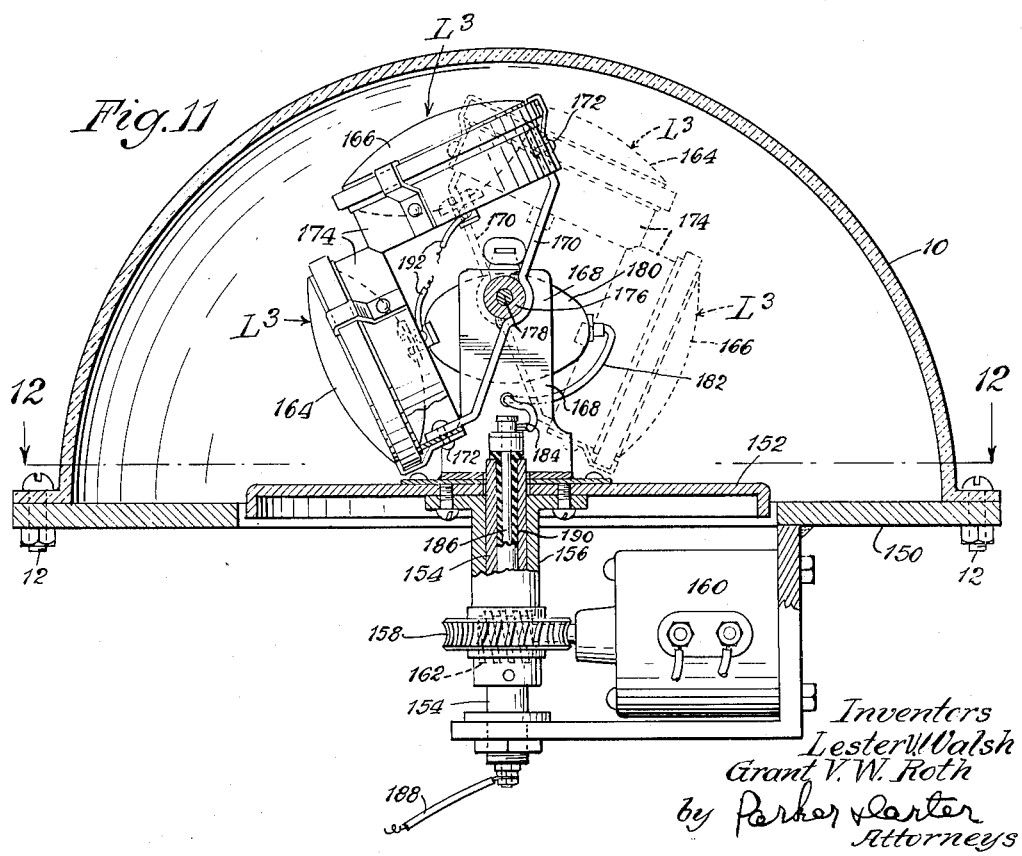

United States Patent Office 2,719,281
Patented Sept. 27, 1955

2,719,281

SIGNAL LIGHT FOR MARINE AVIATION AND VEHICULAR USE

Grant V. W. Roth and Lester V. Walsh, Chicago, Ill.

Application April 11, 1952, Serial No. 281,834

3 Claims. (Cl. 340—25)

This invention relates to signalling and identification lights for use with aircraft, marine vessels, land vehicles and the like.

Identification lighting systems for aircraft have been devised and "flashing" lights have been employed. These flashing lights while serving to indicate aircraft or other vehicles are subject to certain limitations. Such a light may not always be distinguishable from other flashing lights in the community over or through which the vehicle is passing. Furthermore, such lights oftentimes fail to provide sufficient power to be identified at great distances.

A primary object of this invention is to provide an improved signal lighting system for vehicular use wherein a greater range of visibility of the light source is provided.

A further object is to provide an improved lighting system wherein a predetermined pattern of light is formed and serves as a positive means of identification.

It is a still further object of this invention to provide an improved lighting system wherein a plurality of movable light-beams are employed and dispersed throughout a generally hemispherical area.

A further object of this invention is to provide a light beam emanating from a light source on a rotating base with a range of movement between limits defined by the rotating base and a line generally perpendicular to the center of the rotating base.

Another object of this invention is to provide an improved signalling device wherein a signal beam is projected to indicate the relative position of the device with relation to the spatial area surrounding the device.

Another object is to provide a signal light with an improved mechanism for imparting movement to a light beam or beams.

Another object of this invention is to provide an improved signal and identification light with one type of identifying signal which can be seen at one distance from the light and another type of identifying signal which can be seen at a lesser distance.

Other objects of the invention will appear from time to time in the course of the ensuing specification and claims.

Referring generally now to the drawings:

Figure 1 illustrates an airborne vehicle carrying lights of the character employed herein;

Figure 2 illustrates a preferred form of signal light embodying the identification principles referred to herein;

Figure 3 illustrates an enlarged view of one of the lenses employed in the lighting structure of Figure 2;

Figure 4 illustrates a sectional view of the lens shown in Figure 3 taken along the line 4—4 of Figure 3;

Figure 5 shows a plan view of the device shown in Figure 2 taken along the line 5—5 of Figure 2;

Figure 9:
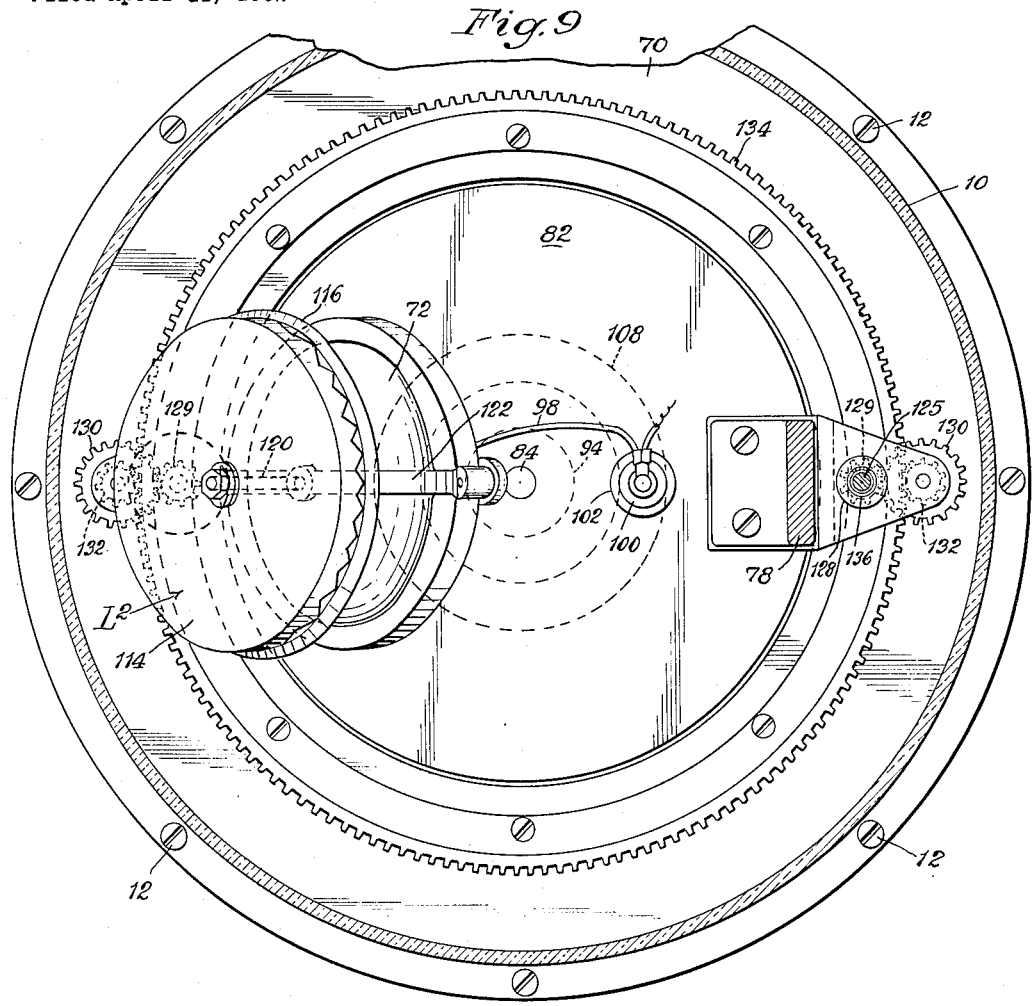
Figure 10:
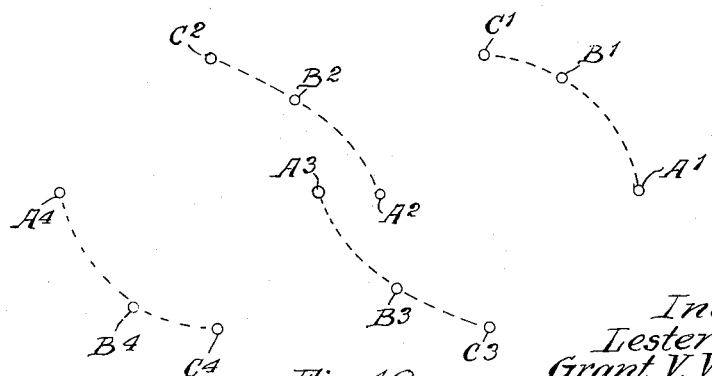

Figure 6 discloses an end elevational view of another form of the invention embodying the identification principles referred to herein;

Figure 7 is an enlarged view of one of the lens units employed in the lighting structure of Figure 6;

Figure 8 is a sectional view of the lens structure shown in Figure 7 taken along the line 8—8 of Figure 7;

Figure 9 is a plan view of the embodiment of Figure 6 taken along the line 9—9 of Figure 6;

Figure 10 is a diagrammatic illustration of the pattern of light produced by the device of Figure 6;

Figure 11 discloses a third form of the invention embodying our signalling and identification principles referred to herein, and Figure 12 discloses a plan view of the embodiment shown in Figure 11 taken along the line 12—12 of Figure 11.

Referring now with particularity to the drawings, wherein like symbols refer to like parts throughout, it will be seen that in Figure 1, we have shown an aircraft with our proposed lighting structures in a desired location.

A indicates generally an aircraft, and 2, 4 and 6 refer to hemispherical transparent housings containing the lighting mechanisms which we preferably employ. It will be appreciated that the location of the lighting structures is not critical. It should be borne in mind, however, that in providing an effective signalling and identification light for such a vehicle, light rays emanating from the housings should be dispersed through a spatial area limited only by the vehicle carrying the lights. As shown this spatial area is defined by the hemispherical housings and the vehicle to which the housings are attached.

In Figure 2 we have disclosed a plurality of light pattern forming structures $L^1$ and $L^1$ including a plurality of light sources movably mounted on a supporting structure 8 adapted for attachment to a vehicle or the like. A transparent hemispherical housing 10 is secured to the supporting structure 8 by any suitable means such as a nut and bolt connection 12. The housing 10 may be colored to give different lighting effects.

14 and 16 represent light sources of the sealed beam variety preferably, carried in supporting rings 18 mounted on and inclined to a rotatable base structure indicated generally at 20. The rotatable base structure 20 preferably includes an upright motor-supporting bracket 22 and a cross-piece 24 employed to hold the light sources 14 and 16 in spaced relationship. An upstanding member 22a on the bracket 22 holds the crosspiece 24 in diametrically spaced relation.

Mounted on the ends of the cross-piece 24 are a pair of light source supporting structures 26 having supporting engagement with the supporting rings 18. The base 20 is rotatably mounted on an upright bearing 28 suitably fixed to the supporting structure 8 by any suitable means such as the flanges 30 and bolts or rivets 32. A depending hollow pivot member 20a is fixed to base 20 and is received within bearing 28. Suitable collars 20b and 20c may be fixed to the pivot member 20a to hold the pivot member 20a and base 20 in spaced relation to bearing 28 and preclude axial movement with respect thereto.

A motor M is supported by the supporting bracket 22 and has an output shaft 34 driving a pinion gear 36. Operatively connected to the pinion gear 36 is an annular or ring gear 38 mounted on the supporting structure 8.

The annular or ring gear 38 may be fixed to the supporting structure 8 by any suitable fastening means such as bolts or rivets 40. When the motor M revolves pinion 36, it will be appreciated that the lighting structures will be rotated with the movable base 20. The motor M is also employed to rotate a plurality of dual lens units forming patterns of light $L^1$ and $L^1$, a lens unit being located adjacent to each light source 14 and 16. In this form of the invention, each lens unit is identical for each light source, and therefore a description of one will suffice as a description of both.

Each lens unit comprises a dual lens structure, one lens being indicated at 44 and the other lens being indicated at 46. The two lenses are mounted on a pivot member 48 for rotational movement with respect to the pivot member 48. Suitable hollow collars 44a and 46a are threadably received in the center of each lens 44 and 46 for reception of the pivot member 48. The two collars 44a and 46a have bossed end portions 44b and 46b in bearing contact with each other and hold the lenses 44 and 46 at a slight distance from one another. A suitable nut 48a on pivot member 48 is employed to prevent the lenses 44 and 46 from slipping off of the end of pivot member 48. Pivot member 48 is fixed to a supporting member 50 as at 50a carried at its opposite ends by the supporting structure 26 and the supporting ring 18. A suitable guard 52 is fixed to the supporting ring and extends outwardly from the light source 14 parallel to the axis of pivot member 48. The two lenses 44 and 46 are of different diameters and have their circumferential portions beveled as at 54 for driving engagement with a conical driving element 56. The dual lens structure of different diameters here employed produces a spiral pattern of light.

For a more detailed description of this spiral pattern of light, references may be had to our co-pending application Serial No. 169,572, filed in the U. S. Patent Office on June 22, 1950, now Patent No. 2,699,536 issued Jan. 11, 1955.

Suffice it to say that by reason of the relative diameters of the two lenses and the employment of the conical driving element 56, the two lenses are driven at different speeds. The lens element 44, which may be formed of glass, plastic or other suitable material, has one face which is nearest the light source 14 provided with a series of grooves to refract the light emanating from light source 14. Lens element 46 also has a series of light refracting grooves formed on its face nearest the light source. A variety of grooves may be employed to create this spiral pattern of the light beam. However, we have found that inclined groove on the order of 50 degrees as shown in Figure 4 is advantageous. In any event the outer limits of the spiral pattern should be on the order of 45 degrees to each side of axis 48 in order to cover the arc defined by the support and the axis of rotation of the base, the arc being struck about the intersection of that axis and the support. When the two lenses are driven at different speeds, a movable light beam forming a spiral pattern is produced.

The light sources 14 and 16 have conduits 14a and 16a leading to a source of electrical energy. Since the conduits 14a and 16a may be supplied with such a source of energy by a wide variety of means the source is not shown herein. As shown in Figure 2, the conduits 14a and 16a are received within the hollow shaft 20a and extend to any suitable slip ring assembly (not shown).

The conic driving element 56 is fixed to a shaft 58 suitably journalled in the support structure 26 which is in driven relationship to a flexible drive cable 60 operatively connected to motor M. If desired, suitable spring means may be employed by the conical driving element 56 and the supporting structure 26 to hold the conical drive element 56 in engagement with the bevelled faces of the two lens elements 44 and 46 and thus compensate for any wear that may take place in the lens elements and conical driving element. It will be understood that any suitable transmission 62 may be interposed between the motor M and the flexible drive cables 60.

The two lighting structures which are rotatably mounted on the supporting structure 8 will create a definite pattern of light when base member 20 is rotated by motor M and the lens units L¹ are rotated by the motor M. At any given point of rotation of the base 20, the spiral patterns produced by the lens units L¹ will effectively throw out a definite pattern of light covering a generally hemispherical area defined by the translucent housing 10.

Referring to Figures 6 through 9, another form of the invention including a pair of light pattern forming structures L² and L² is shown. This form of the invention includes a fixed supporting member 70 adapted for attachment to a vehicle and a pair of light sources 72 and 74. The light sources 72 and 74 are carried by supporting rings 76 suitably supported by diametrically spaced bracket members 78 fixed appropriately as by means of bolts 80 to a rotatable base 82. The rotatable base 82 carries a depending shaft 84 fixed at the center of the rotating base and having an end portion journalled in a motor supporting bracket member 86 depending from the supporting structure 70. Suitable thrust bearing members 84a and 86a may be provided on the shaft 84 and bracket member 86 to support the shaft 84 and base 82. A motor M' is fixed to the bracket 86 by means of bolts 88 and drives a worm 90 in driving engagement with a worm wheel 92 suitably keyed to shaft 84. The motor M' thus serves as a means for rotating shaft 84 and the base 82. If desired, a bearing member 94 depending from the base 82 may be in supporting and bearing contact with an upstanding bearing member 96 on the supporting structure 70.

Power for the two light sources 72 and 74 is provided from electrical conduits 98 in contact with a member 100 on the base 82 and insulated from the base 82 by means of a collar 102 formed of rubber or other suitable insulating material. The member 100 has a depending guide 104 received within the insulating collar 102. A spring biased plunger 106 is received in the guide 104 and contacts a ring 108 supported by the supporting structure 70 and insulated therefrom by means of a spacer ring 110. The contact ring 108 is conected to a source of electrical energy such as a battery B by means of a conduit 112. The batery B is illustrated only in a diagrammatic sense and has an electrical connection to the motor M'. As the base 82 rotates about the supporting structure 70 on the axis 84, the plunger will contact stationary ring 108 and establish an electrical connection between conduit 112 and the light sources 72 and 74.

Since each lens unit is the same as the other in function and structure a description of one will suffice for the other. Each lens unit preferably includes two double refracting lenses 114 and 116. The two lenses 114 and 116 are threaded on a collar 118 which is rotatably mounted on a shaft 120 supported by a member 122 on the light source supporting rings 76. The lens units have their inner faces grooved to provide prisms for refracting light emanating from light sources 72 and 74. As shown each lens refracts the light so as to produce two light beams out of any one beam focused on the lens. The lens 114, by reason of the grooves on its inner face produces two light beams for each of the two light beams emanating from the lens 116. Thus four light beams are produced from the single light beam from the source 72. By making the grooves on the lenses of a desired configuration, the four light beams passing through the lens 114 may be spaced so as to have a divergence on the order of 90 degrees with relation to shaft 120. In the form shown, the grooves on the lenses are on the order of 80 degrees. By reason of having each of the lenses 114 and 116 threadably mounted on a supporting collar 118, one lens may be adjusted with relation to the other thereby producing a variety of figures and forms defined by the four light beams.

The two lenses 114 and 116 are rotated by means of a frictional driving element 124. The inner lens 116 has an end bevelled as at 126 and in driving engagement with the frictional drive element 124. The frictional drive element 124 has a depending shaft journalled in a bearing member 128 fixed to the rotatable base 82. The shaft 125 carries a pinion gear 129 which is driven by an idler gear 130 suitably journalled in the bearing member 128. The idler gear 130 has another gear 132 formed on its lower face which is in driving engagement with a ring or annular gear 134 fixed on the supporting structure 70. Thus, after the base 82 is rotated by motor M' idler gear 130 will be rotated by ring gear 134 through the intermediate gear 132, and will rotate pinion gear 129 and the frictional drive element 124, thus rotating the lens 116 and lens 114. If desired a suitable spring 136 may be interposed between the bearing member 128 and the frictional drive element 124 to compensate for wear and deterioration of the lens 116 and drive element 124.

It will be realized that in the form of the invention shown in Figures 6 through 10 inclusive we have effectively provided 8 light beams movably mounted on the rotatable base 82. As the base 82 is rotated with relation to the light source 72, movement of the 4 light beams emanating from the lens 114 of each light source 72 and 74 is produced. In Figure 10 we have illustrated diagrammatically the pattern of light emanating from the lens 114.

We have represented, more or less diagrammatically, how the light pattern formed by the lens unit of Figures 6, 7 and 8 may be varied. Assuming that the two lenses 114 and 116 have their inclined light refracting surfaces disposed parallel to each other, light emitted from the source 72 is doubly refracted by lens 116 and again doubly refracted by lense 114, producing four light beams $A^1$, $A^2$, $A^3$ and $A^4$ in a straight line. By adjusting lens 114 about collar 118 with relation to lens 116, the beams produced will move consecutively into the positions $B^1$, $B^2$, $B^3$ and $B^4$, and $C^1$, $C^2$, $C^3$ and $C^4$. Thus means are provided for creating a wide variety of patterns for the movable light beams.

In Figure 11 and Figure 12, we illustrate a third form of our invention including a plurality of light pattern forming structures $L^3$ and $L^3$. In this form we employ a supporting structure 150 adapted for attachment to a vehicle or the like which has an hemispherical transparent housing 10 enclosing a plurality of lights. A rotatable base 152 journalled for rotational movement on an upstanding shaft 154 preferably is hollow for a purpose which will be hereinafter pointed out. The rotatable base 152 has fixed to it a depending sleeve 156 journalled on the shaft 154 and carrying a worm wheel 158. A motor 160 is supported on the supporting structure 150 and drives a worm gear 162 in engagement with the worm wheel 158, thus rotating the rotatable base 152 and a pair of diametrically spaced lights 164 and 166, preferably of the sealed beam variety supported on an upstanding bracket member 168. The lights 164 and 166 are preferably held in a 90 degree spaced relationship by means of a spacer member 170. The spacer member 170 is fixed at its opposite ends by means of rivets 172 to the light supporting members 174. The spacer member 170 is fixed to a collar 176, fixed to a shaft 178, journalled in the upstanding bracket member 168. The shaft 178 is driven by a motor 180 of the oscillating type. This type of motor is commonly found in windshield wipers and the like. Motor 180 is fixed to bracket 168. An electrical connection 182 leads from the motor 180 to a contact member 184 in contact with and rotatable about a stationary electrical conduit 186 extending through hollow shaft 154 to a source of electrical energy 188. The stationary conduit 186 may be suitably insulated from the shaft 154 by means of insulation 190 formed of rubber or other suitable material. The lights 164 and 166 have conduit connections 192 extending to the upright contact member 186.

It will thus be seen that in the form of Figures 11 and 12 we provide a plurality of lights oscillatably mounted on a rotatable base 152. It will be understood by those skilled in the art to which this invention appertains that the motor 180 may be used to rotate base 152, thus eliminating the need for the second motor 160. One method of doing this would be to extend a suitable driving connection from the motor 180 to a ring or annular gear supported on the supporting structure 150 in a manner similar to the annular or ring gear 134 of Figure 6.

In the use of the form of the invention shown in Figures 11 and 12 the two lights 164 and 166 oscillate back and forth between the position shown in full line representation in Figure 11 to that shown in dotted line in Figure 11, preferably giving a range of oscillating movement on the order of over 90 degrees. This oscillation takes place while the base 152 is being rotated. By this form of movement given to the lights 164 and 166 we effectively cover a hemispherical area with a definite pattern of light, the pattern of each moving beam being on the order of a series of parabolas.

While it will be realized that we have shown herein a preferred form of the invention, we wish it to be understood that the drawings and explanation thereof should be taken in an illustrative rather than in any limiting sense, and that the invention shown and described herein is capable of many modifications within the spirit of the invention and should be limited only as defined by the hereinafter appended claims. For example, the area covered by the pattern of light may be increased to one greater than hemispherical but less than spherical by elevating each of the rotating bases with respect to the supporting structures and adjusting the light pattern forming structures $L^1$ and $L^1$, or $L^2$ and $L^2$, or the angular relationship of the light pattern forming structures $L^3$ and $L^3$ so that the light beams traverse a path limited generally by the vertical axis of rotation and a line inclined to the vertical axis at an angle greater than that formed by the vertical axis and rotatable base.

The use and operation of our invention are as follows:

The supporting structures 8, 70 or 150 of each of the three lights may be appropriately fixed to the structure of an airplane or other vehicle. By reason of employing the transparent housing 10, we create a residual glow in the housing as the light structures are moved within the housing due to the refractory and dispersing qualities of the transparent housing. Each of the lighting structures enclosed within the transparent housing produces a plurality of movable light beams emanating from the transparent housing, thus effectively covering a hemispherical area. It is well known that a beam of light can be seen for a greater distance than can a light source of the same intensity with no specific beam. By providing a definite pattern to the light beams emanating from the transparent housing a positive means of identifying an aircraft or other vehicle from lights in a surrounding area is established. For example, in the form of the invention shown in Figures 2 to 5, inclusive, the light beams emanating from each of the two light structures "$L^1$" follow a spiral pattern. The two spiral patterns created are continuously rotated through 360 degrees about the axis 28. The speed of rotation of the base number 20 may be so related to the speed of the spiral path taken by the light beams emanating from the light sources 14 and 16 that the beam produced is seen at any point in the hemispherical area covered by the beam.

In the form of the invention shown in Figures 6 through 10, inclusive, we provide a pattern of light consisting of a plurality of beams emanating from each of the lenses 116. In this form the pattern of light produced may be varied by adjusting one lens 116 with relation to the other lens 114. When the base 82 is then rotated the patterns produced by the lens element 114 and 116 may be observed at any point in the hemispherical area covered by these light beams. If desired the relationship of the speed of rotation of the lenses 114 and 116 to the speed of rotation of the base 82 may be set so as to create any desired frequency of the light pattern. In the forms of the invention shown in Figures 11 and 12 we provide a plurality of light beams oscillatably mounted on a rotatable base and creating a generally parabolic pattern. It will be understood that the relationship of the speed of oscillation for the lights 164 and 166 may be so corelated with the speed of rotation of the base 152 as to give any desired frequency to the movement of the light beams emanating from the sources 164 and 166.

While we do not show any device for varying the speed of rotation of the bases with relation to the speed of movements of the light beams, such may be readily accomplished by employing a suitable "step up" or "step down" transmission between the lens driving elements of Figures 2 through 10 and the motors or by utilizing suitable electrical controls such as rheostats for controlling the speeds of the motors of Figures 11 through 12, inclusive.

If it is assumed that an aircraft is approaching the aircraft A from any point in the hemispherical areas defined by the housings 2, 4 or 6 and is at a great distance from the aircraft A, a pilot or other person in the approaching aircraft will first see a periodic pulsating light, this pulsating effect being created by the movement of the beam of light into and out of his line of sight to the aircraft A. The period between pulsations is established by the speed of rotation of the base and the speed of movement of the light beam as previously set forth. As the distance between the approaching aircraft and the aircraft A decreases, the definite patterns of the light beams shown and described herein will become distinguishable, for example the spiral pattern of Figures 2 through 5, the parabolic pattern of the beams of Figures 11 and 12, and the parabolic series pattern of Figures 6 through 10. That is to say, at a critical or small distance from the aircraft A the patterns of light beams emitted from the housings will clearly distinguish the aircraft, give positive identification of the aircraft, and warn a pilot or person in the approaching aircraft of the proximity of the aircraft A. If the approaching aircraft is at a great distance from the aircraft A with no danger of collision, only the pulsating effect of the light beams will be visible.

The identification and signalling structures shown herein are also employed to indicate the relative position of an observer with relation to the vehicle carrying the structures. This is done by adjusting the light pattern forming structures so that a certain frequency of the signal beam is observed at some points in the spatial area surrounding the vehicle, and another frequency is observed at other points in the spatial area. In other words, a plurality of the signal beams are caused to pass successively into and out of the line of sight of the observer at some of the points during one revolution of the base, and a single one of the signal beams passes into and out of the line of sight of the observer at other points in the spatial area during one revolution of the base. For example, in Figures 11 and 12 we have illustrated the two lights as having a range of swinging movement of over 90 degrees about axis 178. In the area or zone directly above the lights an observer will see both the beam produced by source 164 and source 166 during swinging movement from the full line position to the dotted line position of Figure 11. Since an observer outside of this zone or area will see only the beam produced by source 164 or 166 during this swinging movement, the observer in the zone or area directly above the lights will see twice the number of light beams that the observer outside of this area will see. From this it will be apparent that in some positions of the observer with relaton to the base one frequency of the light beams may be observed and that in other positions of the observer with relation to the base another frequency of the light beams may be observed. As shown in dotted lines in Figure 11, for example, the lights 166, 164 are oscillated together while at the same time being rotated with the base 152. The light beams projected by lights 166, 164 are arranged to be projected outwardly at right angles to each other. Each of the lights is oscillated through an arc of well over 100° and, as the parts are shown in the drawings, they may be arranged to oscillate through an arc of 135°. Since, however, the light 166 at its low point of oscillation replaces light 164 and vice versa, it will be seen that the two light beams are effective to cover an arm of over 180°. It will be realized that the rate of oscillation will be maintained, in correlation with the rate of rotation of base 152 to insure that the lights 164, 166 will all project beams radially outwardly from the base 152 at substantially all points about its periphery. Such projected beam will of course appear uninterrupted to a viewer whose eye level is approximately of the horizontal plane of base 152. Such a viewer will see a single light beam which will appear to be flashy. As the observer's eye level rises above the horizontal plane of base 152, on the other hand, portions of both light beams projected by lights 164, 166 begin to be seen and of course a viewer from above the dome 10 will see beams from both lights which, as a result of their rapid oscillation and rotation, will appear to be projected at a much greater frequency than that of the beams projected radially from just one of the lights. Thus, an aviator, for example, may judge the relative heighth of other aircraft at night by observing the frequency of light beams seen emanating from the dome 10.

While the foregoing operation is discussed in view of the arrangement of parts in the drawings, it will be realized that the dome 10 may be installed on the bottom of an aircraft as shown at 6 in Fig. 1, in which case the effect on a viewer at the horizontal plane of base 152 would be the same and the effect of a viewer from below would be the same as that upon the viewer from above previously described. This same effect is obtained in the embodiments of Figures 2 through 5 and Figures 6 through 10. In Figures 2 through 5, the spiral pattern of the light beam overlaps in some positions of the spatial area due to the rotation of the base 20. In these positions then, an observer will see a different frequency of the light than that seen in other positions. In Figures 6 through 10, the rotating light beams produced by each of the light pattern forming structures $L^2$ and $L^2$ overlap (or pass through the same points) generally at those points in the spatial area defined by the conic area formed by the axis of rotation 84 and lens axis 120, as the base 82 rotates about its axis 84 thereby producing a different frequency at these points. It will be appreciated that the areas of different frequencies may be enlarged or diminished by varying the range of swinging movement of the lights 164 and 166 of Figures 11 and 12, by adjusting the relationship of the light beams of Figures 6 through 10 (as shown in Figure 10) or by varying the spiral pattern of Figures 2 through 5.

Thus it will be seen that we have provided a signalling and identification light which can be seen at great distances, provides identification at those distances and gives a positive identification of its associated vehicle at critical or smaller distances.

We claim:

1. In a signalling and identification light, a support, a base mounted for rotation on said support about a vertical axis, a pair of lights mounted for oscillation together and one behind the other about a generally horizontal axis positioned above said base, the path of oscillation of each of said lights extending through an arc of over 100°, said lights being mounted for rotation with said base about the axis of rotation thereof, said lights being connected at an angle one to the other whereby the light beams projected therefrom are projected in angular relationship to each other at all points during said rotation and oscillation and at least one of said light beams is projected in angular relationship with both of said axes throughout the course of oscillation of said lights, the path of oscillation of each of said lights having its terminal ends on opposite sides of said vertical axis, whereby the oscillatory path of one light overlaps the oscillatory path of the other light and means for rotating said base and oscillating said lights, said means being adjustable whereby said lights may be simultaneously oscillated and rotated at a rate sufficient to cause a light beam from one of said lights to be projected radially from said base at substantially all points about the axis thereof and to cause a light beam from each of said lights to be projected upwardly therefrom.

2. In a signalling and identification light, a support, a base mounted for rotation on said support about a vertical axis, a translucent hemispherical dome above said base and having its peripheral edge generally in the horizontal plane occupied by said base, a pair of lights mounted on said base for rotation therewith within said dome and connected together at their edges to project a pair of light beams through said dome, said light beams being projected at substantially 90° to each other and in a single vertical plane bisecting the axis of rotation of said base, said lights being mounted for oscillatory movement together within said dome and about a horizontal axis, the oscillatory path of said lights following the arc of said dome and having its terminal ends on opposite sides of said vertical base axis, the oscillatory path of each of said lights individually extending from a point adjacent said base to a point beyond the vertical whereby said individual paths are caused to overlap and means for simultaneously rotating said base and lights and oscillating said lights to projects outwardly through said dome a light beam radially at substantially all points about the periphery of said dome at one frequency and to project a light beam generally upwardly through said dome at a greater frequency.

3. In a signalling and identification light assembly, a base mounted for rotation about a vertical axis, a pair of lights mounted on said base for rotation therewith and secured together to project a pair of light beams at right angles to each other in a single vertical plane above said base, said lights being mounted for oscillation about a horizontal axis above said base, the path of oscillation of said lights extending in an arc above said base, said arc having its opposite lower terminal ends adjacent the horizontal plane of said base and its apex above said vertical base axis, the individual path of oscillation of each light extending through an arc of over 90° whereby said individual paths are caused to overlap adjacent said apex and means for simultaneously oscillating said lights and rotating said base and lights to produce a pattern of light beams varying in frequency throughout a hemispherical area above said base, the frequency of light beams projected radially from said vertical base axis being less than that of light beams projected upwardly from said base.

References Cited in the file of this patent
UNITED STATES PATENTS

| | | |
|---|---|---|
| 1,548,958 | Sperry | Aug. 11, 1925 |
| 1,905,267 | Corey | Apr. 25, 1933 |
| 2,221,483 | Kennelly | Nov. 22, 1940 |
| 2,332,383 | Kost | Oct. 19, 1943 |
| 2,345,382 | Cramer | Mar. 28, 1944 |
| 2,409,046 | Kennelly | Oct. 8, 1946 |
| 2,442,569 | Kennelly | June 1, 1948 |
| 2,460,585 | Kennelly | Feb. 1, 1949 |
| 2,510,892 | Kennelly | June 6, 1950 |
| 2,578,239 | Gosswiller | Dec. 11, 1951 |
| 2,607,838 | McDowell | Aug. 19, 1952 |